United States Patent
Bose

(10) Patent No.: US 11,861,856 B2
(45) Date of Patent: Jan. 2, 2024

(54) SYSTEMS AND METHODS FOR IMAGE PROCESSING

(71) Applicant: SHANGHAI UNITED IMAGING HEALTHCARE CO., LTD., Shanghai (CN)

(72) Inventor: Supratik Bose, Huston, TX (US)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 727 days.

(21) Appl. No.: 16/914,357

(22) Filed: Jun. 27, 2020

(65) Prior Publication Data
US 2020/0327684 A1  Oct. 15, 2020

(51) Int. Cl.
G06T 7/33 (2017.01)
G06T 7/246 (2017.01)

(52) U.S. Cl.
CPC .............. G06T 7/337 (2017.01); G06T 7/248 (2017.01); G06T 2207/30004 (2013.01)

(58) Field of Classification Search
USPC .................................................. 382/128, 294
See application file for complete search history.

(56) References Cited

U.S. PATENT DOCUMENTS

| | | |
|---|---|---|
| 7,231,076 B2 | 6/2007 | Fu et al. |
| 8,818,105 B2 | 8/2014 | Myronenko et al. |
| 9,014,454 B2 * | 4/2015 | Zankowski .......... A61N 5/1038 382/132 |
| 11,288,841 B2 * | 3/2022 | Wu ........................ G06T 7/75 |
| 11,354,800 B2 * | 6/2022 | Bose ..................... A61N 5/1038 |
| 2009/0187422 A1 * | 7/2009 | Kaus ..................... G16H 20/40 705/2 |
| 2011/0102568 A1 | 5/2011 | Bonnet |
| 2011/0280461 A1 | 11/2011 | Bystrov et al. |

(Continued)

FOREIGN PATENT DOCUMENTS

| | | |
|---|---|---|
| CN | 107194925 A | 9/2017 |
| CN | 109461140 A | 3/2019 |

OTHER PUBLICATIONS

Seregni et al., A Hybrid Image Registration and Matching Framework for Real-time Motion Tracking in MRI-Guided Radiotherapy, IEEE Transaction on Bimedical Engineering, vol. 65 No. 1, Jan. 2018, 0018-9294, pp. 131-139. (Year: 2018).*

(Continued)

*Primary Examiner* — Ishrat I Sherali
(74) *Attorney, Agent, or Firm* — METIS IP LLC

(57) ABSTRACT

Systems and methods for determining a target region of interest (ROI) for image registration is provided. The methods may include obtaining a target image of a subject including a target portion of the subject and obtaining feature information related to a movement of one or more feature portions of the subject. The methods may further include identifying, from the one or more feature portions, one or more reference portions of the subject based on the feature information. A position of the target portion of the subject is unrelated to a movement of the one or more reference portions. The methods may further include determining, in the target image, the target ROI based on corresponding feature information related to the one or more reference portions.

20 Claims, 7 Drawing Sheets

(56) References Cited

U.S. PATENT DOCUMENTS

| | | | |
|---|---|---|---|
| 2013/0235969 A1* | 9/2013 | Winter | A61N 5/1079 378/4 |
| 2014/0064449 A1 | 3/2014 | Deng et al. | |
| 2017/0024884 A1 | 1/2017 | Ishihara et al. | |
| 2018/0276821 A1 | 9/2018 | Lin et al. | |
| 2018/0344411 A1 | 12/2018 | Fahey et al. | |
| 2020/0320326 A1* | 10/2020 | Dou | A61B 6/469 |
| 2021/0267691 A1 | 9/2021 | Lang | |

OTHER PUBLICATIONS

First Office Action in Chinese Application No. 202110719200.2 dated Jul. 28, 2022, 15 pages.

Chen, Zhaoxue et al., Research on Roi Motion Tracking Algorithm of CT Liver Perfusion Image Sequence, Computer Applications and Software, 30(11): 161-163+205, 2013.

Liu, Zhao-Ying et al., Multi-Mode Image Registration Based on Mutual Information of Region of Interests, Aero Weaponry, 4: 7-12, 2011.

Xue, Ling-Yun et al., Extraction of ROI in Medical mage, Journal of Hangzhou Dianzi University, 26(2): 19-22, 2006.

Hyejoo Kang et al., Accurate Positioning for Head and Neck Cancer Patients Using 2d and 3d Image Guidance, Journal of Applied Clinical Medical Physics, 12(1): 86-96, 2011.

Ren Lei et al., Automatic Registration between Reference and On-Board Digital Tomosynthesis Images for Positioning Verification, Medical Physics, 35(2): 664-672, 2008.

Li Guang et al., Clinical Assessment of 2D/3D Registration Accuracy in 4 Major Anatomic Sites Using On-Board 2D Kilovoltage Images for 6D Patient Setup, Technology in Cancer Research and Treatment, 14(3): 305-314, 2015.

Aurélien Venara et al., Tomodensitometric Survey of the Distance between Thoracic and Abdominal Vital Organs and the Wall According to BMI, Abdominal Diameter and Gender: Proposition of an Indicative Chart for the Forensic Activities, Forensic Science International, 229(2013): 167.e1-167.e6, 2013.

Hassan Abbas et al., Motion Management in Gastrointestinal Cancers, World Journal of Gastrointestinal Oncology, 5(3): 223-235, 2014.

Langen, K. M. et al., Organ Motion and Its Management, International Journal of Radiation Oncology Biology Physics, 50(1): 265-278, 2001.

Golnoosh Samei, Multi-Organ Respiratory Motion Modeling, PhD Thesis, ETH Zurich Research Collection, 2014, 115 pages.

* cited by examiner

SYSTEMS AND METHODS FOR IMAGE PROCESSING

TECHNICAL FIELD

The present disclosure generally relates to image processing, and more particularly, relates to systems and methods for determining a target region of interest (ROI) for image registration.

BACKGROUND

In medical image processing, image registration usually refers to a process of performing a certain spatial transformation between two or more images of a subject so as to facilitate comparison between the images of the subject taken at different time points and/or stages of a disease. Image registration has been widely used for medical diagnosis and treatment. For example, image registration may need to be performed in the process of image-guided radiation therapy (IGRT). A treatment image acquired before or during a radiation treatment often needs to be registered with a planning image generated for planning the radiation treatment so that the radiation treatment may be accurately delivered to a target portion of a subject according to the treatment plan. Some image registration techniques may include determining a target ROI in an image to be registered with another image. The determination of the target ROI may significantly affect the accuracy and/or efficiency of a result of the image registration. Thus, it is desirable to develop systems and methods for determining a target ROI that may improve the accuracy and/or efficiency of image registration.

SUMMARY

According to an aspect of the present disclosure, a method for determining a target region of interest (ROI) for image registration is provided. The method may be implemented on a computing device having at least one processor and at least one non-transitory storage medium. The method may include obtaining a target image of a subject including a target portion of the subject and obtaining feature information related to a movement of one or more feature portions of the subject. The method may further include identifying, from the one or more feature portions, one or more reference portions of the subject based on the feature information, wherein a position of the target portion of the subject is unrelated to a movement of the one or more reference portions. The method may further include determining, in the target image, the target ROI based on corresponding feature information related to the one or more reference portions.

In some embodiments, the one or more feature portions of the subject include one or more first feature portions relating to a physiological movement.

In some embodiments, the identifying, from the one or more feature portions, one or more reference portions of the subject includes determining, based on the target image, a first distance between the target portion and each of one or more portions at risk of the subject, each of the one or more portions at risk relating to the target portion; and for each of the one or more first feature portions of the subject, determining, based on the target image, a second distance between the target portion and the first feature portion, and determining, based on the corresponding feature information related to the first feature portion, the first distance and the second distance, whether the first feature portion is one of the one or more reference portions.

In some embodiments, the image registration may include registering the target image with a reference image. The target image may be generated based on a first scan of the subject holding a first pose at a first time point. The reference image may be generated based on a second scan of the subject holding a second pose at a second time point. The second time point may be different from the first time point.

In some embodiments, the one or more feature portions of the subject include one or more second feature portions. A movement of the one or more second feature portions may relate to a pose difference between the first pose and the second pose.

In some embodiments, the identifying, from the one or more feature portions, one or more reference portions of the subject may include, for each of the one or more second feature portions of the subject, determining, based on the target image, a third distance between the target portion and the second feature portion; and determining, based on the corresponding feature information related to the second feature portion and the third distance, whether the second feature portion is one of the one or more reference portions.

In some embodiments, the target image may be a planning image for a radiotherapy treatment, and the reference image may be a treatment image for the radiotherapy treatment.

In some embodiments, the determining, in the target image, the target ROI based on feature information related to the one or more reference portions may include determining an initial ROI in the target image and determining the target ROI by performing, based on the initial ROI, an iterative process including a plurality of iterations. The iterative process corresponds to one or more rules, and when at least one of the one or more rules is satisfied, the iterative process is terminated. The one or more rules include at least one rule relating to the feature information of the one or more reference portions.

In some embodiments, the determining the target ROI by performing, based on the initial ROI, an iterative process including a plurality of iterations may include: in each of the plurality of iterations, adjusting an intermediate ROI to obtain an adjusted ROI, wherein the intermediate ROI is the initial ROI or an adjusted ROI obtained in a prior iteration; determining whether at least one of the one or more rules is satisfied; in response to determining that at least one of the one or more rules is satisfied, terminating the iterative process; and designating the adjusted ROI as the target ROI.

In some embodiments, the one or more reference portions may include one or more first reference portions relating to a physiological movement. The at least one rule relating to the feature information of the one or more reference portions may include that the adjusted ROI includes a pixel or voxel corresponding to a movement region of at least one of the one or more first reference feature portions, wherein the movement region is determined, in the target image, based on the feature information related to a movement of the one or more first reference feature portions.

In some embodiments, the one or more reference portions may include one or more second reference portions. A position of each of the one or more second reference feature portions may be related to a pose of the subject. The at least one rule relating to the feature information of the one or more reference portions includes that the adjusted ROI includes at least one pixel or voxel corresponding to at least one of the one or more second reference feature portions.

In some embodiments, the determining an initial ROI in the target image may include identifying, in the target image, an isocenter related to a radiotherapy treatment; and determining, in the target image, the initial ROI based on the isocenter, wherein the isocenter is located at a center of the initial ROI.

In some embodiments, the method may further include determining, in the target ROI, a target sub-ROI for the image registration.

According to another aspect of the present disclosure, a system is provided. The system may include at least one non-transitory storage medium including a set of instructions for determining a target region of interest (ROI) for image registration; and at least one processor in communication with the at least one non-transitory storage medium. When executing the set of instructions, the at least one processor is configured to cause the system to perform operations. The operations may include obtaining a target image of a subject including a target portion of the subject and obtaining feature information related to a movement of one or more feature portions of the subject. The operations may further include identifying, from the one or more feature portions, one or more reference portions of the subject based on the feature information, wherein a position of the target portion of the subject is unrelated to a movement of the one or more reference portions. The operations may further include determining, in the target image, the target ROI based on corresponding feature information related to the one or more reference portions.

According to yet another aspect of the present disclosure, a non-transitory computer readable medium is provided, comprising at least one set of instructions, wherein when executed by at least one processor of a computing device, the at least one set of instructions direct the at least one processor to perform operations. The operations may include obtaining a target image of a subject including a target portion of the subject and obtaining feature information related to a movement of one or more feature portions of the subject. The operations may further include identifying, from the one or more feature portions, one or more reference portions of the subject based on the feature information, wherein a position of the target portion of the subject is unrelated to a movement of the one or more reference portions. The operations may further include determining, in the target image, the target ROI based on corresponding feature information related to the one or more reference portions.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Figure 2:
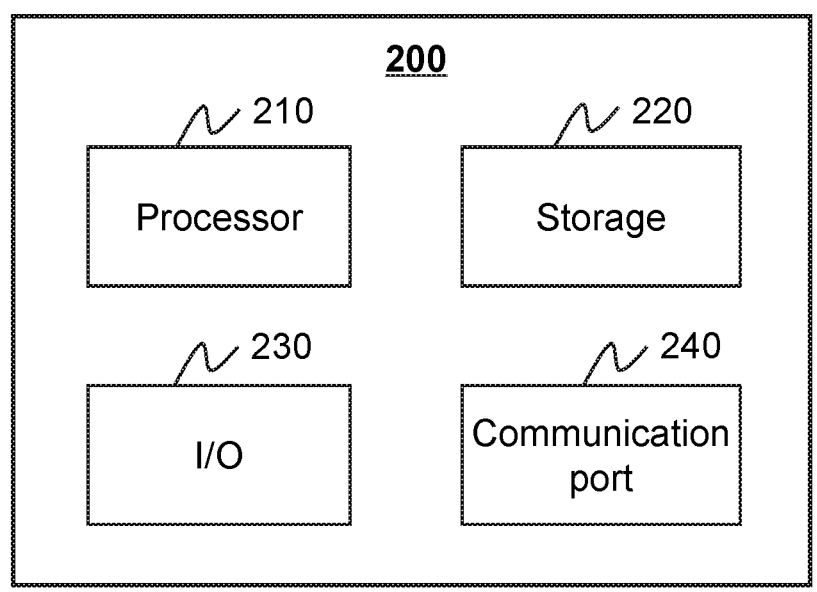
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The term "image" in the present disclosure is used to collectively refer to image data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image. The term "region," "location," and "area" in the present disclosure may refer to a location of an anatomical structure shown in the image or an actual location of the anatomical structure existing in or on a target subject's body, since the image may indicate the actual location of a certain anatomical structure existing in or on the target subject's body. In some embodiments, an image of an object may be referred to as the object for brevity. Segmentation of an image of an object may be referred to as segmentation of the object. For example, segmentation of an organ refers to segmentation of a region corresponding to the organ in an image.

The present disclosure provides mechanisms (which can include methods, systems, a computer-readable medium, etc.) for determining a target region of interest (ROI) for image registration. The methods provided in the present disclosure may include obtaining a target image related to the subject including a target portion of the subject and obtain feature information related to a movement of one or more feature portions (e.g., organs and/or tissue) of the subject. For example, the movement of the one or more feature portions may include a physiological movement, such as a respiratory movement, a cardiac movement, an artery pulsation, etc. As another example, the movement of the one or more feature portions may include a movement caused by a pose difference relating to the subject. The methods may further include identifying, from the one or more feature portions, one or more reference portions of the subject based on the feature information. A position of the target portion of the subject may be unrelated to a movement of the one or more reference portions. The target ROI may be determined based on corresponding feature information related to the one or more reference portions.

In some conventional methods for determining the target ROI, feature portions of the subject related to a physiological movement or a pose difference are often excluded from the target ROI. For example, such feature portions may be segmented from the target image and removed from the target image before the determination of the target ROI. The methods provided by the present disclosure may include determining whether the movement of a feature portion related to a physiological movement or a pose difference affects the position of the target portion of the subject. If the movement of a feature portion affects the position of the target portion, the position of the feature portion may be highly relevant to the position of the target portion. In some embodiments of the present disclosure, the target ROI may incorporate such a feature portion, which may effectively improve the accuracy of the result of image registration of medical images, thereby improving the efficiency and/or accuracy of diagnosis and/or treatment performed based thereon. Additionally or alternatively, if the accuracy of image registration is improved, it may be more efficiently for further processing including, e.g., modification of the result of image registration by a user (e.g., an operator).

Figure 1:
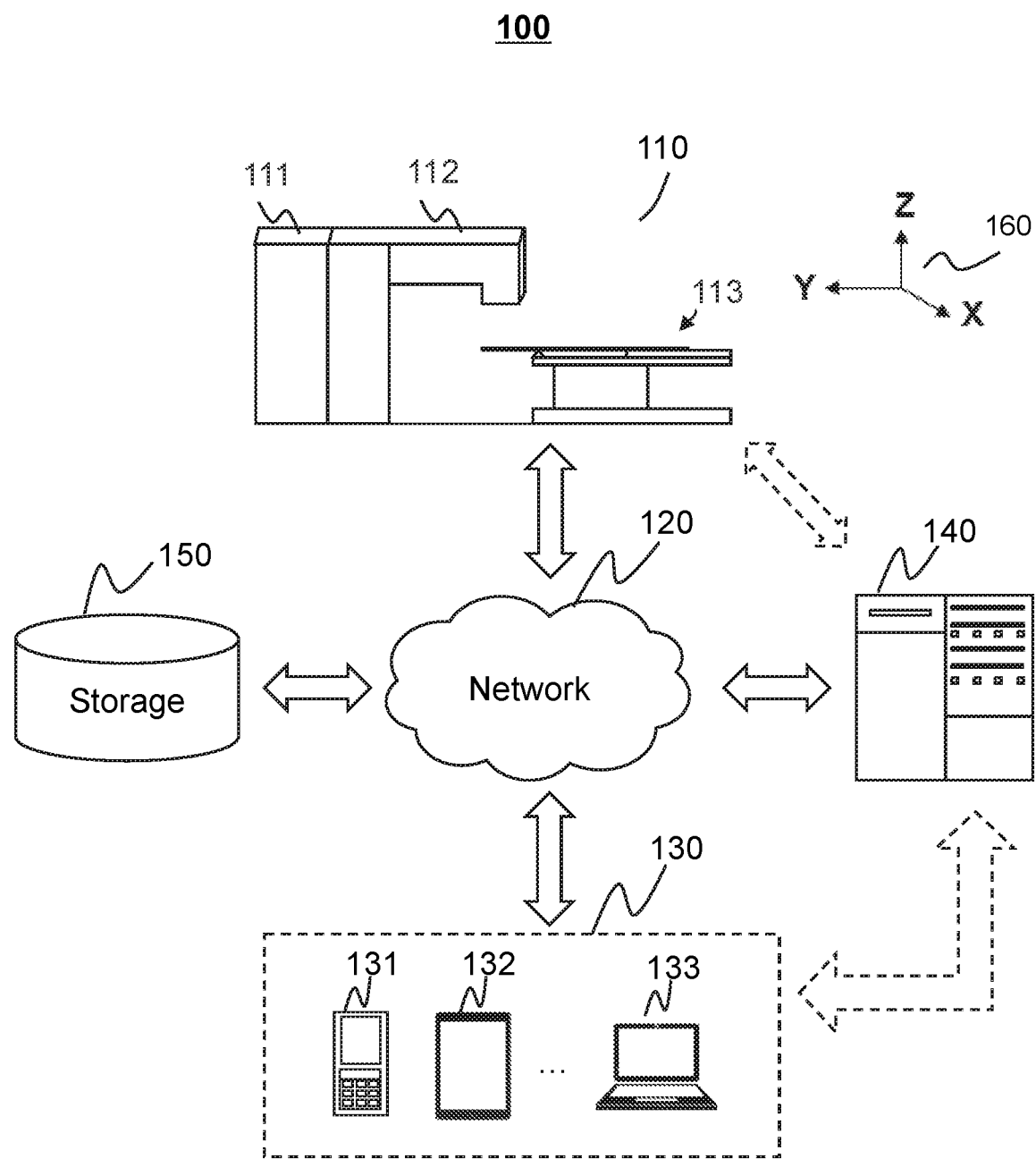
FIG. 1 is a schematic diagram illustrating an exemplary medical system according to some embodiments of the present disclosure.

FIG. 1 is a schematic diagram illustrating an exemplary medical system 100 according to some embodiments of the present disclosure. As shown, the medical system 100 may include a medical device 110, a network 120, one or more terminals 130, a processing device 140, and a storage device 150. In some embodiments, the medical device 110, the terminal(s) 130, the processing device 140, and/or the storage device 150 may be connected to and/or communicate with each other via a wireless connection (e.g., the network 120), a wired connection, or a combination thereof. The connection between the components of the medical system 100 may be variable. Merely byway of example, the medical device 110 may be connected to the processing device 140 through the network 120, as illustrated in FIG. 1. As another example, the medical device 110 may be connected to the processing device 140 directly. As a further example, the storage device 150 may be connected to the processing device 140 through the network 120, as illustrated in FIG. 1, or connected to the processing device 140 directly. As still a further example, a terminal 130 may be connected to the processing device 140 through the network 120, as illustrated in FIG. 1, or connected to the processing device 140 directly.

The medical device 110 may include an imaging device, a radiotherapy device, or a combination thereof. The imaging device may generate or provide image data via scanning a subject (e.g., a patient) disposed on a scanning table of the medical device 110. In some embodiments, the medical device 110 may include a single-modality scanner and/or a multi-modality scanner. The single-modality scanner may include, for example, a computed tomography (CT) scanner. The multi-modality scanner may include a single-photon emission computed tomography-computed tomography (SPECT-CT) scanner, a positron emission tomography-computed tomography (PET-CT) scanner, a computed tomography-ultra-sonic (CT-US) scanner, a digital subtraction angiography-computed tomography (DSA-CT) scanner, or the like, or a combination thereof. In some embodiments, the image data may include projection data, images relating to the subject, etc. The projection data may be raw data generated by the medical device 110 by scanning the subject or data generated by a forward projection on an image relating to the subject. In some embodiments, the subject may include a body, a substance, an object, or the like, or a combination thereof. In some embodiments, the subject may include a specific portion of a body, such as a head, a thorax, and abdomen, or the like, or a combination thereof. In some embodiments, the subject may include a specific organ or region of interest, such as an esophagus, a trachea, a bronchus, a stomach, a gallbladder, a small intestine, a colon, a bladder, a ureter, a uterus, a fallopian tube, etc.

In some embodiments, the medical device 110 may include a radiotherapy device for performing a radiation treatment. For example, the medical device 110 may include a multi-modality (e.g., two-modality) apparatus to acquire a medical image and perform the radiation treatment. The medical image may be a Computed Tomography (CT) image, a (Magnetic Resonance Imaging) MRI image, an ultrasonic image, a four-dimensional (4D) image, a three-dimensional (3D) image, a two-dimensional (2D) image, a diagnostic image, and a non-diagnostic image, or the like, or a combination thereof. The medical device 110 may include one or more diagnostic devices and/or treatment devices. For example, a CT device, a Cone beam CT, a Positron Emission Tomography (PET) CT, a Volume CT, an RT device, and a couch, or the like, or a combination thereof.

As illustrated in FIG. 1, the medical device 110 (e.g., an IGRT device) may include an imaging device 111, a radiotherapy device 112, a couch 113, or the like, or a combination thereof. The imaging device 111 may obtain scan data of a subject. The radiotherapy device 112 may perform a radiation treatment according to a treatment image generated based on the scan data. The imaging device 111 and the RT device 112 may share the couch 113 in an IGRT process.

In some embodiments, the medical device 110 may be integrated with one or more other devices that may facilitate the scanning or treatment of the subject, such as an image-recording device. The image-recording device may be configured to take various types of images related to the subject. For example, the image-recording device may be a two-dimensional (2D) camera that takes pictures of the exterior or outline of the subject. As another example, the image-recording device may be a 3D scanner (e.g., a laser scanner, an infrared scanner, a 3D CMOS sensor) that records the spatial representation of the subject.

The network 120 may include any suitable network that can facilitate the exchange of information and/or data for the medical system 100. In some embodiments, one or more components of the medical system 100 (e.g., the medical device 110, the processing device 140, the storage device 150, the terminal(s) 130) may communicate information and/or data with one or more other components of the medical system 100 via the network 120. For example, the processing device 140 may obtain image data from the medical device 110 via the network 120. As another example, the processing device 140 may obtain user instruction(s) from the terminal(s) 130 via the network 120. The network 120 may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, routers, hubs, switches, server computers, and/or any combination thereof. For example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the medical system 100 may be connected to the network 120 to exchange data and/or information.

The terminal(s) 130 may be connected to and/or communicate with the medical device 110, the processing device 140, and/or the storage device 150. For example, the terminal(s) 130 may obtain a processed image from the processing device 140, such as a display image including a target ROI. As another example, the terminal(s) 130 may enable user interactions with the medical system 100. In some embodiments, the terminal(s) 130 may include a mobile device 131, a tablet computer 132, a laptop computer 133, or the like, or any combination thereof. For example, the mobile device 131 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 130 may include an input device, an output device, etc. The input device may include alphanumeric and other keys that may be input via a keyboard, a touch screen (for example, with haptics or tactile feedback), a speech input, an eye-tracking input, a brain monitoring system, or any other comparable input mechanism. The input information received through the input device may be transmitted to the processing device 140 via, for example, a bus, for further processing. Other types of input device may include a cursor control device, such as a mouse, a trackball, or cursor direction keys, etc. The output device may include a display, a speaker, a printer, or the like, or a combination thereof. In some embodiments, the terminal(s) 130 may be part of the processing device 140.

The processing device 140 may process data and/or information obtained from the medical device 110, the storage device 150, the terminal(s) 130, or other components of the medical system 100. For example, the processing device 140 may determine, for each of one or more feature portions of the subject, whether a position of the target portion of the subject is unrelated to the movement of the one or more reference portions. In response to determining that the position of the target portion of the subject is unrelated to the movement of the one or more reference portions. As another example, the processing device 140 may determine the target ROI based on feature information related to the one or more reference portions. In some embodiments, the processing device 140 may be a single server or a server group. The server group may be centralized or distributed. In some embodiments, the processing device 140 may be local to or remote from the medical system 100. For example, the processing device 140 may access information and/or data from the medical device 110, the storage device 150, and/or the terminal(s) 130 via the network 120. As another example, the processing device 140 may be directly connected to the medical device 110, the terminal(s) 130, and/or the storage device 150 to access information and/or data. In some embodiments, the processing device 140 may be implemented on a cloud platform. For example, the cloud platform may include a private cloud, a public cloud, a hybrid cloud, a community cloud, a distributed cloud, and inter-cloud, a multi-cloud, or the like, or a combination thereof. In some embodiments, the processing device 140 may be implemented by a computing device 200 having one or more components as described in connection with FIG. 2.

The storage device 150 may store data, instructions, and/or any other information. In some embodiments, the storage device 150 may store data obtained from the processing device 140, the terminal(s) 130, and/or the storage device 150. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components of the medical system 100 (e.g., the processing device 140, the terminal(s) 130). One or more components of the medical system 100 may access the data or instructions stored in the storage device 150 via the network 120. In some embodiments, the storage device 150 may be part of the processing device 140.

In some embodiments, a three-dimensional coordinate system 160 may be used in the medical system 100 as illustrated in FIG. 1. A first axis may be parallel to the lateral direction of the couch (e.g., the X-direction as shown in FIG. 1). A second axis may be parallel to the longitudinal direction of the couch (e.g., the Z-direction as shown in FIG. 1). A third axis may be parallel to a vertical direction of the couch (e.g., the Y direction as shown in FIG. 1). The origin of the three-dimensional coordinate system may be any point in the space. The origin of the three-dimensional coordinate system may be determined by an operator. The origin of the three-dimensional coordinate system may be determined by the medical system 100. In some embodiments, the position of the one or more portions of the subject (e.g., the one or more feature portions) may be described using the 3D coordinate system 160. In some embodiments, the position of different pixels or voxels of an image may be described using the 3D coordinate system 160.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device 150 may be a data storage including cloud computing platforms, such as public cloud, private cloud, community, and hybrid clouds, etc. However, those variations and modifications do not depart the scope of the present disclosure.

FIG. 2 is a schematic diagram illustrating exemplary hardware and/or software components of an exemplary computing device 200 on which the processing device 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process image data obtained from the medical device 110, the terminals 130, the storage device 150, and/or any other component of the medical system 100. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, and thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operation s A and B).

The storage 220 may store data/information obtained from the medical device 110, the terminals 130, the storage device 150, and/or any other component of the medical system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 140 for determining the position of a target region of a subject (e.g., a target portion of a patient).

The I/O 230 may input and/or output signals, data, information, etc. In some embodiments, the I/O 230 may enable a user interaction with the processing device 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing device 140 and the medical device 110, the terminals 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
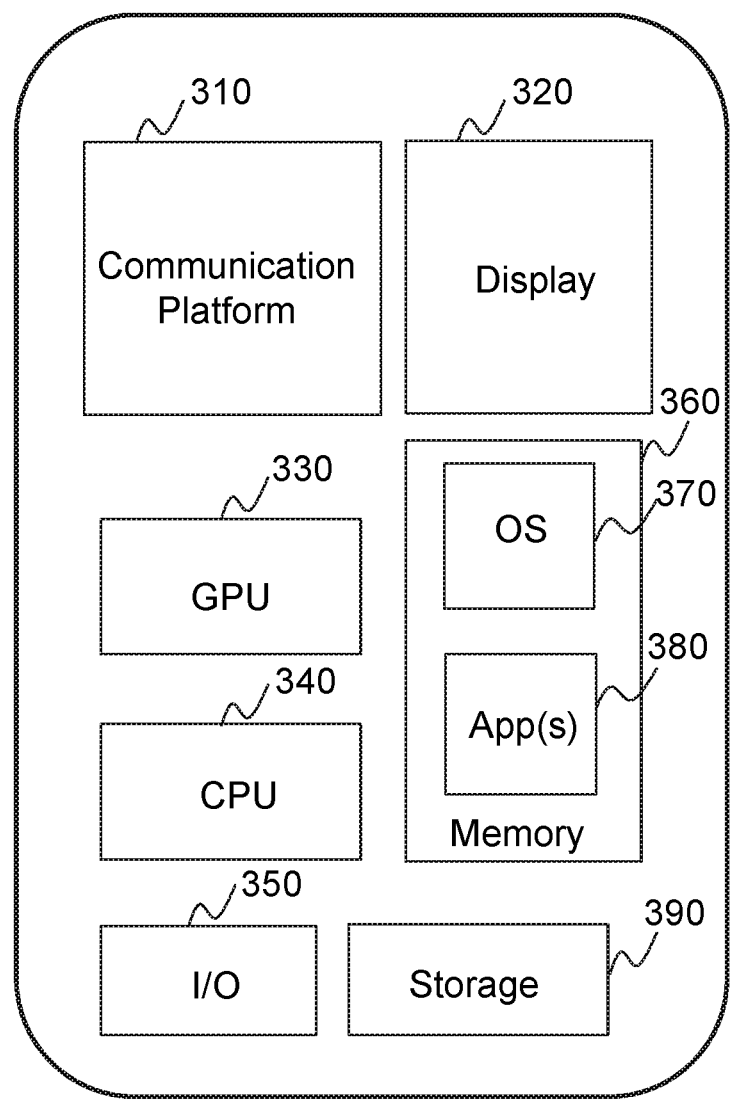
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the terminals 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the medical system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of workstation or terminal device. A computer may also act as a server if appropriately programmed.

Figure 4:
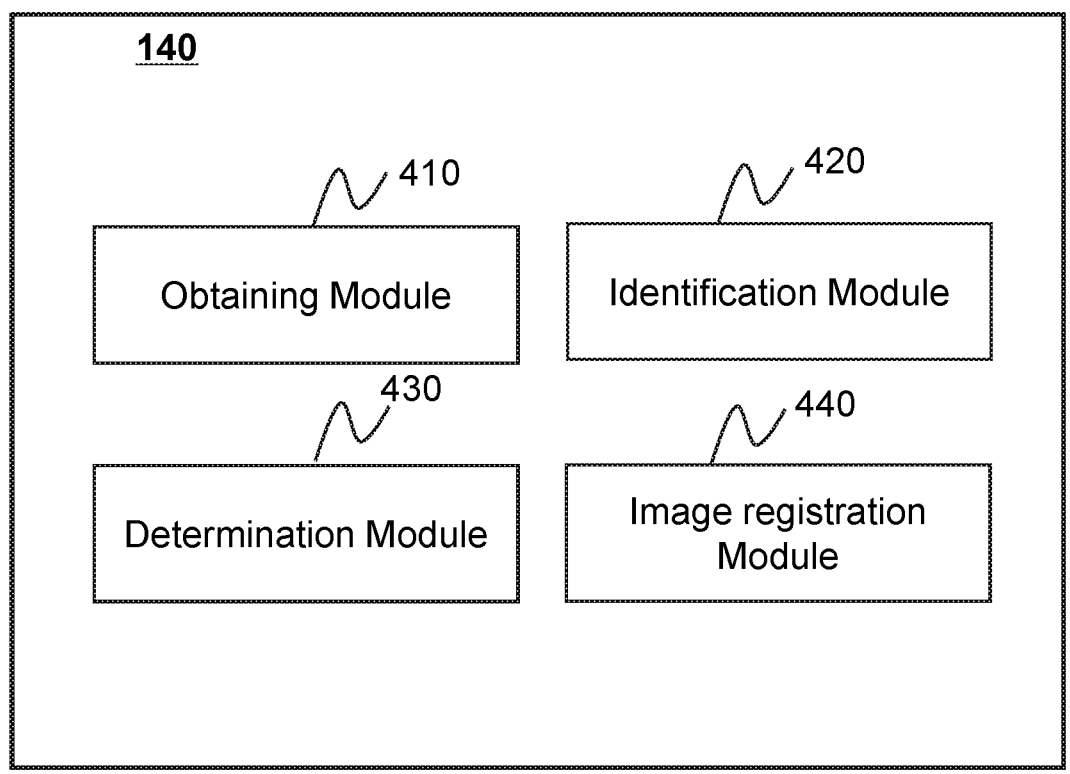
FIG. 4 is a block diagram illustrating an exemplary processing device according to some embodiments of the present disclosure.

FIG. 4 is a block diagram illustrating an exemplary processing device 140 according to some embodiments of the present disclosure. As illustrated in FIG. 4, the processing device 140 may include an obtaining module 410, an identification module 420, a determination module 430, and an image registration module 440. The modules may be hardware circuits of all or part of the processing device 140. The modules may also be implemented as an application or set of instructions read and executed by the processing device 140. Further, the modules may be any combination of the hardware circuits and the application/instructions. For example, the modules may be part of the processing device 140 when the processing device 140 is executing the application/set of instructions.

The obtaining module 410 may obtain data related to the medical system 100. In some embodiments, the obtaining module 410 may obtain a target image related to the subject. The target image may include a target portion of the subject. For instance, the subject may be a patient or an animal (e.g., a dog, a cat). The target portion may include one or more organs or different tissue, or a portion thereof, of the subject. In some embodiments, the target portion may relate to an injury (e.g., a fracture), a lesion, etc. Merely by way of example, the target portion may include a tumor. In some embodiments, the obtaining module 410 may obtain feature information related to a movement of one or more feature portions of the subject.

The identification module 420 may identify one or more reference portions of the subject. In some embodiments, the identification module 420 may determine, for each of the one or more first feature portions, whether the first feature portion is one of the one or more reference portions based on a first distance, a second distance, and the feature information related to the first feature portion. In some embodiments, the processing device 140 may determine, for each of the one or more first feature portions, whether the second feature portion is one of the one or more reference portions. For example, the identification module 420 may determine, for each of the one or more second feature portions of the subject, a third distance between the target portion and the second feature portion. The identification module 420 may segment, from the target image, the one or more portions at risk, the one or more first feature portions, the one or more second feature portions, and the target portion. The first distance, the second distance, and/or the third distance may be determined based on a result of the segmentation.

The determination module 430 may determine a target ROI for image registration. In some embodiments, the determination module 430 may determine the target ROI in the target image based on feature information related to the one or more reference portions. In some embodiments, the determination module 430 may determine an initial ROI in the target image. The determination module 430 may determine the target ROI by performing an iterative process including a plurality of iterations based on the initial ROI. The iterative process may correspond to one or more rules. In each of the plurality of iterations, the determination module 430 may determine whether at least one of the one or more rules is satisfied. In response to determining that at least one of the one or more rules is satisfied, the determination module 430 may terminate the iterative process.

The image registration module 440 may register the target image with a reference image. Merely by way of example, the processing device 140 may register the target image with the reference image using a feature-based algorithm, e.g., by aligning the target ROI with the reference ROI. In some embodiments, the image registration module 430 may generate a reference ROI in the reference image. The reference ROI may correspond to the target ROI, indicating that both the reference ROI and the target ROI correspond to the same portion of the subject. There may be a correlation between the reference ROI and the target ROI. The reference ROI may have the same shape and/or size as the target ROI. For example, the target image may be a planning image related to a radiation treatment, and the reference image may be a treating image related to the radiation treatment. The center of the target ROI in the planning image may be a planning isocenter, and the center of the reference ROI in the treatment image may be a treatment isocenter. In some embodiments, when the dimensions of the target image and the reference image are the same, the dimensions of the target ROI and the reference ROI may be the same. For example, the target ROI and the reference ROI may both be a 2D region. Alternatively, the dimensions of the target image and the reference image may be different. For instance, the target image may be a 3D image and the reference image may be a 2D image. The target ROI may be a 3D region and the reference image may be a 2D image. The registration may include a 3D-3D registration, a 3D-2D registration, a 2D-2D registration, or the like.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, a module mentioned above may be divided into two or more units. For example, the identification module may be divided into two units, one of which may be configured to identify one or more reference portions of the subject, and the other one may be configured to identify a reference region in the reference image. The reference region may correspond to the target image data. In some embodiments, the processing device 140 may include one or more additional modules. For example, the processing device 140 may further include a control module configured to generate control signals for one or more components in the medical system 100.

In some embodiments, one or more modules of the processing device 140 described above may be omitted. For example, the processing device 140 may be configured to determine a target ROI, and another computing device may be configured to perform an image registration operation based on the target ROI. Thus, the image registration module 440 may be omitted in the processing device 140.

Figure 5:
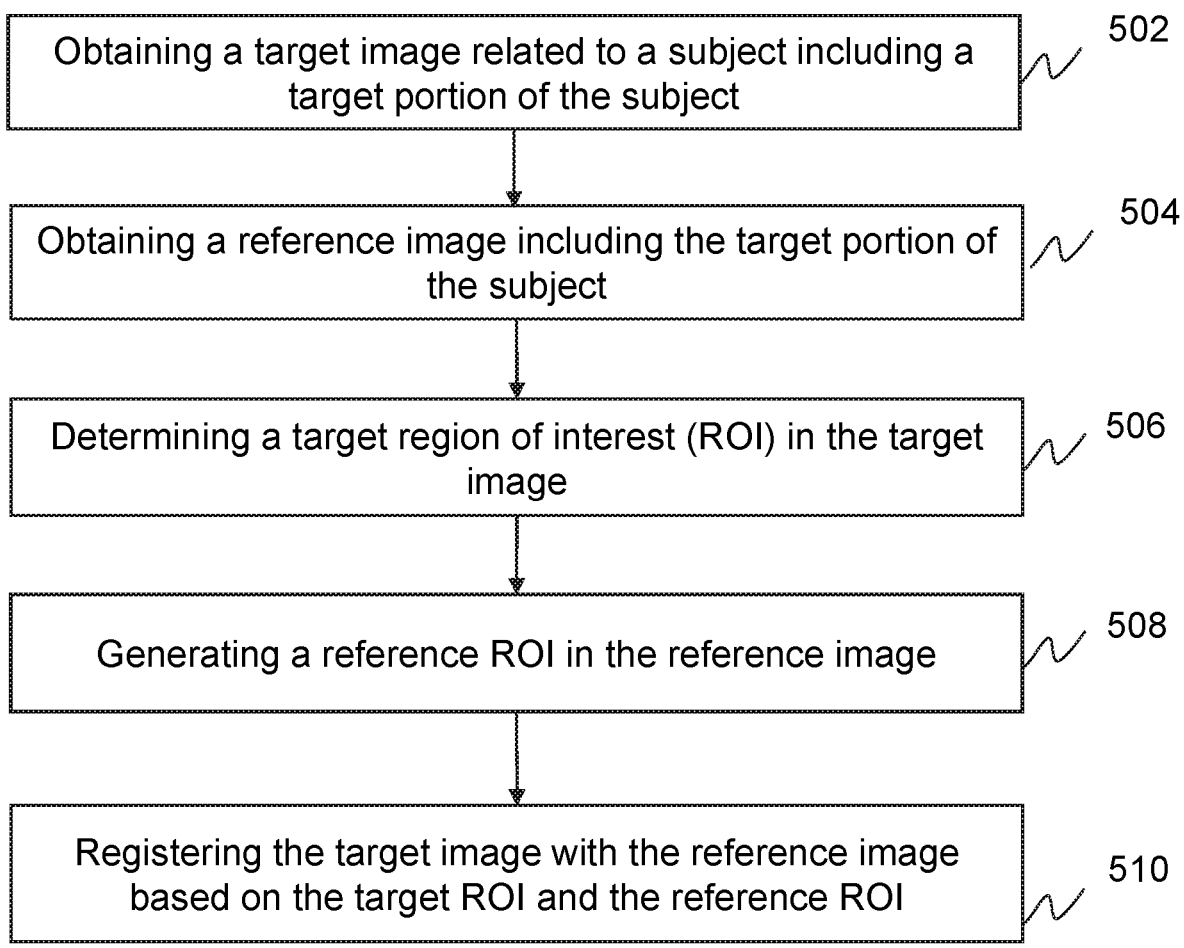
FIG. 5 is a flowchart illustrating an exemplary process for image registration according to some embodiments of the present disclosure.

FIG. 5 is a flowchart illustrating an exemplary process for image registration according to some embodiments of the present disclosure. At least a portion of process 500 may be implemented by the processing device 140 (e.g., the processor 210 of the computing device 200 as illustrated in FIG. 2, the CPU 340 of the mobile device 300 as illustrated in FIG. 3, one or more modules as shown in FIG. 4). The operations of the illustrated process presented below are intended to be illustrative. In some embodiments, the process 500 may be accomplished with one or more additional operations not described, and/or without one or more of the operations discussed. Additionally, the order in which the operations of the process 2100 as illustrated in FIG. 5 and described below is not intended to be limiting.

In 502, the processing device 140 (e.g., the obtaining module 410) may obtain a target image related to the subject. The target image may include a target portion of the subject. For instance, the subject may be a patient or an animal (e.g., a dog, a cat). The target portion may include one or more organs or different tissue, or a portion thereof, of the subject. In some embodiments, the target portion may relate to an injury (e.g., a fracture), a lesion, etc. Merely by way of example, the target portion may include a tumor.

The processing device 140 may obtain the target image from one or more components of the medical system 100 (e.g., the medical device 110 or the storage device 150). The target image may be a two-dimensional (2D) image, a three-dimensional (3D) image, a four-dimensional (4D) image (e.g., a temporal series of 3D images), etc. In some embodiments, the target image may be generated based on a first scan of the subject at a first time point. The first scan may be performed by a first imaging device, such as a CT scanner, a PET scanner, an MRI scanner, etc. The subject may hold a first pose at the first time point when the first scan is performed by the first imaging device. In some embodiments, the target image may be a planning image related to a radiation treatment.

In 504, the processing device 140 (e.g., the obtaining module 410) may obtain a reference image related to the subject. The reference image may include a representation of the target portion of the subject.

The processing device 140 may obtain the reference image from one or more components of the medical system 100 (e.g., the medical device 110 or the storage device 150). In some embodiments, the reference image may be generated based on a second scan of the subject at a second time point. The second time point may be different from the first time point. For example, the second time point may be later than the first time point. The second scan may be performed by a second imaging device, such as a CT scanner, a PET scanner, an MRI scanner, etc. The subject may hold a second pose at the second time point when the second scan is performed by the second imaging device.

In some embodiments, the first imaging device and the second imaging device may be of the same type. For instance, the target image may be a planning image configured for generating a radiation treatment plan. The planning image may be generated based on a scan before a radiation treatment. In some embodiments, when generating the radiation treatment plan, the planning image may be segmented to obtain one or more portions at risk. For example, the contour of the one or more portions at risk may be marked in the planning image. The radiation treatment may include multiple radiation fractions. In each of the multiple radiation fractions, a portion of a total radiation dose is delivered to the target portion of the subject. The reference image may be a treatment image configured for guiding the radiation treatment. The treatment image may be generated based on a scan before each of the multiple radiation fractions. The target portion of the subject may move, for example, due to a physiological movement. The treatment image may include a representation of the target portion of the subject to be treated, a position of the target portion of the subject to be treated, and/or other information. Alternatively, the first imaging device and the second imaging device may be of different types. For instance, the first imaging device may be a CT scanner and the second imaging device may be an MRI scanner.

In 506, the processing device 140 (e.g., the determination module 430) may determine a target ROI in the target image. In some embodiments, the target ROI may include at least a part of a representation of the target portion of the subject.

In some embodiments, one or more feature portions of the subject may move due to various reasons. For example, the movement of the one or more feature portions may include a physiological movement, such as a respiratory movement, a cardiac movement, an artery pulsation, etc. The physiological movement may cause a position of the feature portion to change and/or cause the shape/volume of the feature portion to change. A feature portion related to the physiological movement may be referred to as a first feature portion hereafter. The first feature portion may include, for example, the diaphragm, the rib-cage, the bladder, the rectum, or the like, or a portion thereof, or any combination thereof, of the subject. As another example, the position of the one or more feature portions may depend on the pose of the subject when receiving a scan. Such a feature portion is referred to as a second feature portion hereafter. The movement of the one or more second feature portions may be caused by a pose difference between the first pose and the second pose. Such movement caused by the pose difference is also referred to as an interfractional movement. The second feature portion may include, for example, an arm, a hand, a finger, a foot, or the like, or a portion thereof, or any combination thereof, of the subject.

The processing device 140 may obtain feature information related to the movement of the one or more feature portions of the subject. Merely by way of example, the feature information related to the movement of a feature portion may include a moving range related to the feature portion. Additionally or alternatively, the feature information may include whether the movement of the feature portion affects the position of a lesion (e.g., a tumor, a fracture) located at a specific site. The processing device 140 may identify one or more reference portions of the subject from the one or more feature portions based on the feature information. A position of the target portion of the subject may be unrelated to the movement of the one or more reference portions at the time when the scan is performed. The processing device 140 may further determine the target ROI in the target image based on corresponding feature information related to the one or more reference portions. More details regarding the determination of the target ROI may be found elsewhere in the present disclosure, for example, in FIG. 6, FIG. 7, and the description thereof.

In 508, the processing device 140 (e.g., the image registration module 440) may generate a reference ROI in the reference image. The reference ROI may correspond to the target ROI, indicating that both the reference ROI and the target ROI correspond to the same portion of the subject.

In some embodiments, the processing device 140 may generate the reference ROI based on information relating to the target ROI. Merely by way of example, the target image may be a planning image related to a radiation treatment, and the reference image may be a treating image related to the radiation treatment. The processing device 140 may identify, in the reference image, a feature point corresponding to an isocenter (e.g., treatment isocenter). The processing device 140 may further generate the reference ROI in the reference image based on the feature point corresponding to the isocenter. For instance, the processing device 140 may designate the feature point as a center (e.g., a geometric center) of the reference ROI and generate the reference ROI having the same shape and/or size as the target ROI.

In 510, the processing device 140 (e.g., the image registration module 440) may register the target image with the reference image based on the target ROI and the reference ROI. Merely by way of example, the processing device 140 may register the target image with the reference image using a feature-based algorithm, e.g., by aligning the target ROI with the reference ROI. In some embodiments, when the dimensions of the target image and the reference image are the same, the dimensions of the target ROI and the reference ROI may be the same. For example, the target ROI and the reference ROI may both be a 2D region. Alternatively, the dimensions of the target image and the reference image may be different. For instance, the target image may be a 3D image and the reference image may be a 2D image. The target ROI may be a 3D region and the reference image may be a 2D image. The registration may include a 3D-3D registration, a 3D-2D registration, a 2D-2D registration, or the like. To register the target ROI with the reference image, the processing device 140 may project the 3D target ROI onto a plane to generate a 2D target ROI. The plane may include, for example, a transverse plane, a coronal plane, or a sagittal plane, or an oblique plane that is other than a transverse plane, a coronal plane, and a sagittal plane. The 2D target ROI may be used for registering the target image with the 2D reference image. The 2D target ROI and the 2D reference ROI may both be in a same plane.

For example, when the target image is a planning image, and the reference image is a treatment image, the target image may be registered with the reference image to correlate a first position of the subject in the first scan to a second position of the subject in the second scan. In some embodiments, the processing device 140 and/or a user (e.g., an operator) may cause a position of one or more movable components of the radiotherapy device to be adjusted based on a result of the image registration between the target image and the reference image (or referred to as a registration result for brevity) so that the radiation treatment may be accurately delivered to the target portion of the subject.

As another example, the target image and the reference image may be both used for diagnosis purposes. For instance, the target image and the reference image may both be CT images of the subject. The image registration may aid a user (e.g., a doctor) in visualizing and monitoring pathological changes in the subject over time. For example, the image registration may help the user monitor and/or detect a change in, e.g., size, density, or the like, or a combination thereof, of a tumor or a nodule over time. When the first imaging device and the second imaging device are of different types, the target image may be registered with the reference image so that a composite image may be generated by fusing the target image and the reference image. For instance, the target image may be a CT image and the reference image may be an MRI image. The composite image may provide anatomical information and/or functional information related to the subject with improved accuracy for diagnosis and/or treatment purposes.

In some embodiments, the processing device 140 may further determine a target sub-ROI in the target ROI in operation 506. The processing device 140 may further identify a reference sub-ROI in the reference image in operation 508. The reference sub-ROI may correspond to the target sub-ROI. The target image and the reference image may be registered based on the target sub-ROI and the reference sub-ROI. Merely byway of example, the processing device 140 may define an entropy measure H of the target ROI and select a region within the target ROI corresponding to the maximum entropy measure as the target sub-ROI. In this way, the target sub-ROI may include relatively rich information which may help improve the accuracy of the image registration result.

It should be noted that the above description regarding the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be omitted and/or one or more additional operations may be added. For example, the process 500 may further include an operation to generate, based on the target image, a display image representing the target ROI. Additionally or alternatively, the process 500 may further include transmitting the display image to a terminal device (e.g., the terminal device 130) of a user. The user may view and/or modify the target ROI via the terminal device.

Figure 6:
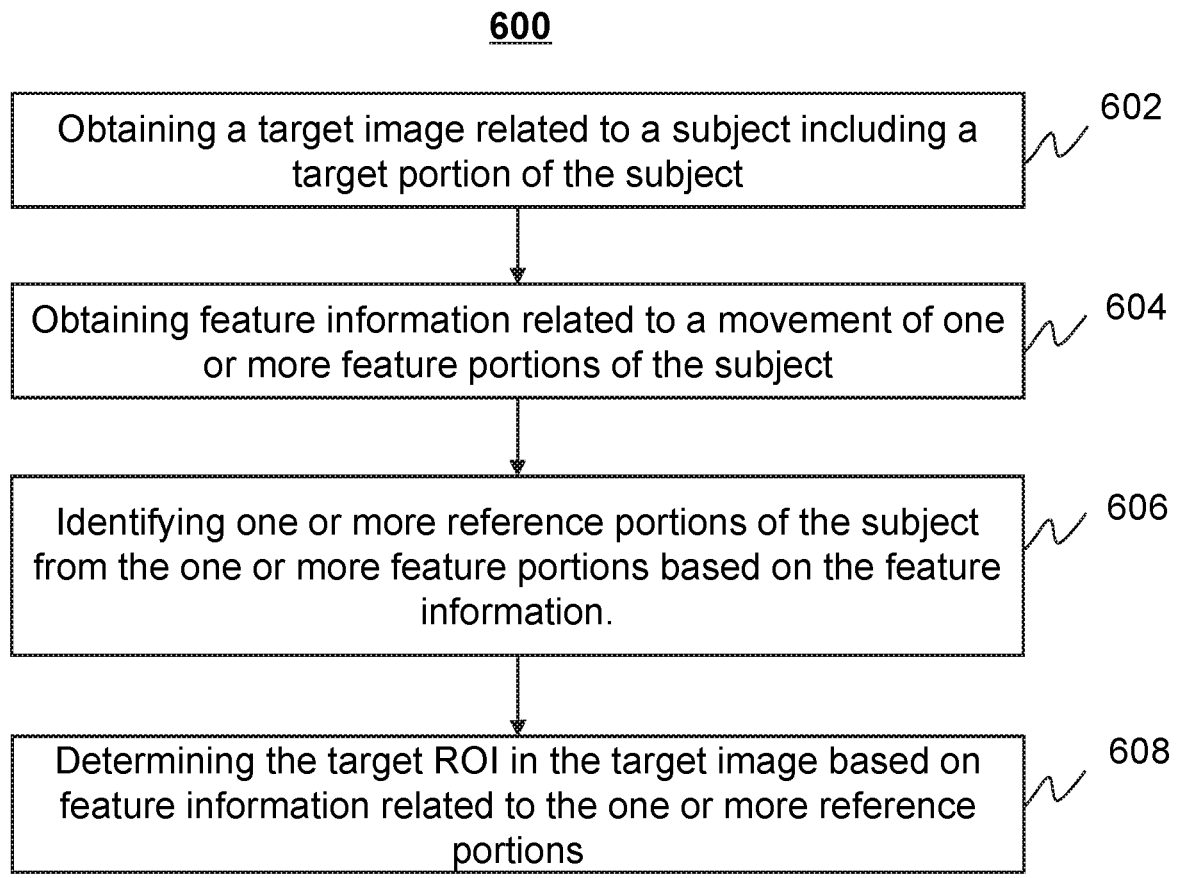
FIG. 6 is a flowchart illustrating an exemplary process for determining a target ROI in the target image according to some embodiments of the present disclosure.

FIG. 6 is a flowchart illustrating an exemplary process for determining a target ROI in the target image according to some embodiments of the present disclosure. At least a portion of process 600 may be implemented by the processing device 140 (e.g., the processor 210 of the computing device 200 as illustrated in FIG. 2, the CPU 340 of the mobile device 300 as illustrated in FIG. 3, one or more modules as shown in FIG. 4). The operations of the illustrated process presented below are intended to be illustrative. In some embodiments, the process 600 may be accomplished with one or more additional operations not described, and/or without one or more of the operations discussed. Additionally, the order in which the operations of the process 2100 as illustrated in FIG. 6 and described below is not intended to be limiting.

In 602, the processing device 140 (e.g., the obtaining module 410) may obtain a target image related to the subject. The target image may include a representation of a target portion of the subject. The target image may be registered with a reference image. the target image may be a planning image related to a radiation treatment, and the reference image may be a treating image related to the radiation treatment. Operation 602 may be performed in a manner similar to operation 502.

In 604, the processing device 140 (e.g., the obtaining module 410) may obtain feature information related to a movement of one or more feature portions of the subject.

In some embodiments, the processing device 140 may determine the one or more feature portions of the subject based on information available in a library stored in a storage device (e.g., the storage device 150). Merely for illustration purposes, the target portion of the subject may include a tumor. In some embodiments, a user (e.g., an operator) may input at least some subject information via the terminal device 130. The processing device 140 may obtain the subject information from the terminal device 130. In some embodiments, the processing device 140 may retrieve at least some subject information from a profile of the subject including, e.g., a patient record of the subject. Exemplary subject information may include the age, the gender, the body weight, the body height, the thickness of the body, information related to the target portion (e.g., a tumor site, a tumor type) of the subject, etc. The processing device 140 may retrieve, based on at least some of the subject information and from the library, one or more features of one or more specific portions of the subject. For example, the one or more features of a specific portion may include whether the specific portion of the subject is at risk surrounding a tumor (which may receive undesired radiation during a radiation treatment targeted at the tumor) corresponding to a tumor site and/or a tumor type related to the target portion, whether the specific portion of the subject tends to move or remain static, whether a position of the specific portion of the subject is affected by a pose of the subject for receiving a scan by an imaging device, a movement range of the specific portion, or the like, or any combination thereof, of the subject. The processing device 140 may select the one or more feature portions from the one or more specific portions. The processing device 140 may further determine feature information related to the movement of the one or more feature portions based on the one or more features corresponding to the one or more feature portions.

The library may include information regarding multiple tumor types, multiple tumor sites, and multiple feature portions (e.g., organs and/or tissue) of one or more reference subjects corresponding to the multiple tumor types and tumor sites. Exemplary tumor types may include carcinoma, sarcoma, myeloma, leukemia, lymphoma, or the like, or any combination thereof, of the one or more reference subjects. Exemplary tumor sites may include the skin, a lung, a breast, the prostate, the colon, the rectum, the colon, the cervix, the uterus, or the like, or any combination thereof, of the one or more reference subjects. Each of the one or more feature portions of a reference subject may include one or more features corresponding to a tumor type and/or a tumor site of the reference subject. For instance, the library may be generated based on historical data related to different feature portions of the one or more reference subjects. As another example, a user may manually add to the library one or more features of a feature portion of a reference subject, or modify one or more features of a feature portion of a reference subject that is already in the library. In some embodiments, the library may be stored in the storage device 150 in the form of a table.

The one or more features of a feature portion of a reference subject may include the age, the gender, the body weight, the body height, the thickness of the body, whether the portion of the subject is a portion at risk surrounding the tumor (e.g., an organ or tissue that may receive undesired radiation during a radiation treatment), whether the portion tends to move or remain static, a moving direction, whether a position of the portion is affected by a pose of the subject for receiving a scan by an imaging device, a movement range of the portion, or the like, or any combination thereof. Additionally or alternatively, the one or more features of the portion may further include whether the portion of the subject is a first feature portion relating to a physiological movement, whether the portion of the subject is a second feature portion whose position depends on the pose of the subject for receiving a scan, whether the movement of the second feature portion affects a position of the tumor, or the like, or any combination thereof.

The processing device 140 may further determine one or more feature portions of the subject based on the library and at least some of the subject information related to the subject (e.g., the tumor site, the tumor type, the gender). As described in connection with operation 506, the one or more feature portions of the subject may include one or more first feature portions related to the physiological movement and one or more second feature portions related to a pose of the subject for performing a scan. The processing device 140 may further obtain the feature information related to the one or more feature portions from the library. The feature information of a feature portion of the subject may include reference feature information of one or more features of a feature portion of each of one or more reference subjects. The feature portion of the subject may be the same as or similar to the feature portion of each of the one or more reference subjects. For instance, the feature portion of the subject and each of the reference subject(s) is the same—a tumor in the liver of the subject and each of the reference subject(s). As another example, the feature portion of the subject and each of the reference subject(s) is the same—a tumor in the left lung of the subject and each of the reference subject(s), all deemed at a same progression stage. In some embodiments, the feature information of a similar feature portion of multiple reference subjects may be presented in the library as individual groups of feature information each corresponding to one reference subject, or a single group of feature information (e.g., averaged across the reference subjects).

In 606, the processing device 140 (e.g., the identification module 420) may identify one or more reference portions of the subject from the one or more feature portions based on the feature information.

In some embodiments, the processing device 140 may determine, for each of the one or more first feature portions, whether the first feature portion is one of the one or more reference portions based on a first distance, a second distance, and the feature information related to the first feature portion. If a first feature portion is determined as one of the one or more reference portions, the first feature portion is also referred to as a first reference portion. The first distance refers to a distance between the target portion and each of one or more portions at risk of the subject in the target image. The second distance refers to a distance between the target portion and the first feature portion in the target image. In some embodiments, the first distance and/or the second distance may be a distance along the moving direction of the first feature portion. The moving direction may be described using the coordinate system 160 illustrated in FIG. 1. For instance, the moving direction may be denoted as a +X direction or a −X direction. When a first feature portion moves along a +X direction, the first distance and/or a second distance may be a distance along the +X direction. The feature information may include a movement range of the first feature portion. The movement range may include the moving direction of a first feature portion and the moving distance of the first feature portion along the moving direction. For instance, the movement distance of the liver (i.e., a first feature portion relating to a respiratory movement) may be approximately 11 millimeters along a moving direction related to the respiratory movement.

In some embodiments, the feature information related to the movement of the second feature portion may include whether the movement of the first feature portion affects the position of a lesion (e.g., a tumor, a fracture) located at various sites. The processing device 140 may determine, for each of the one or more first feature portions, whether the first feature portion is one of the one or more reference portions based on the feature information related to the first feature portion. For example, the feature information related to the first feature portion may include whether the movement of the first feature portion affects the position of a tumor located on the diaphragm, a tumor located in the brain, a tumor located in the stomach, etc. The processing device 140 may determine whether the first feature portion is one of the one or more reference portions based on information related to the target portion (e.g., a tumor site) and the feature information related to the first feature portion.

In some embodiments, to identify the one or more reference portions, the processing device 140 may segment, from the target image, the one or more portions at risk, the one or more first feature portions, the one or more second feature portions, and the target portion. As another example, the segmentation of at least some of the fore-mentioned portions may be performed in advance. The processing device 140 may obtain a result of the segmentation from a storage (e.g., the storage 150). For instance, the target image may be a planning image related to a radiation treatment. The target portion and the one or more portions at risk may be segmented from the planning image when planning for the radiation treatment. The first distance between the target portion and a portion at risk may be a minimum distance along the moving direction between a feature point corresponding to the target portion in the target image and a point corresponding to the portion at risk. For example, the feature point may be a center point (e.g., a geometric center, a center of mass, etc.) of the target portion in the target image. The point corresponding to the portion at risk may be a center point (e.g., a geometric center, a center of mass, etc.) of the portion at risk. Similarly, the second distance between the target portion and a first feature portion may be a minimum distance along the moving direction between the feature point corresponding to the target portion in the target image and a point corresponding to the first feature portion. In some embodiments, the target image may be a planning image for generating a radiation treatment plan. The target portion may be a 2D planning target region or a 3D planning target volume (PTV). The feature point may be an isocenter related to a radiation treatment, such as a planning isocenter. As used herein, the term "planning isocenter" refers to a point in space where radiation beams emitted from different angles are expected (planned) to intersect when the gantry of the radiotherapy device is rotating.

In some embodiments, the processing device 140 may determine a minimum first distance among the one or more first distances. The processing device 140 may determine a distance difference between the second distance and the minimum first distance. The processing device 140 may compare the distance difference with the moving range of the first feature portion. In response to determining that the distance difference is greater than the moving range of the first feature portion, the processing device 140 may determine that the movement of the first feature portion does not affect the position of the target portion of the subject. The processing device 140 may designate the first feature portion as one of the one or more reference portions.

In some embodiments, the processing device 140 may determine, for each of the one or more first feature portions, whether the second feature portion is one of the one or more reference portions. If a second feature portion is determined as one of the one or more reference portions, the second feature portion is also referred to as a first reference portion. For example, the processing device 140 may determine, for each of the one or more second feature portions of the subject, a third distance between the target portion and the second feature portion. A third distance may be determined similarly to how a first distance or a second distance is determined, the description of which is not repeated here. The processing device 140 may further compare the third distance with a distance threshold. In response to determining that the third distance is less than the distance threshold, the processing device 140 may designate the second feature portion as one of the one or more reference portions. In some embodiments, the feature information related to the second feature portion may include whether the movement of the second feature portion affects the position of a lesion (e.g., a tumor, a fracture) located at various sites. For example, the feature information related to the second feature portion may include whether the movement of the second feature portion affects the position of a tumor located in the breast, a tumor located in the brain, a tumor located in the stomach. Merely as an example, the feature information related to a left hand (i.e., an exemplary second feature portion) may include that the movement of the left hand does not affect the position of a tumor located in the breast. The processing device 140 may determine whether the second feature portion is one of the one or more reference portions based on information related to the target portion (e.g., a tumor site) and the feature information related to the second feature portion.

In 608, the processing device 140 (e.g., the determination module 430) may determine the target ROI in the target image based on feature information related to the one or more reference portions. In some embodiments, the processing device 140 may determine an initial ROI in the target image. The processing device 140 may determine the target ROI by performing an iterative process including a plurality of iterations based on the initial ROI. The iterative process may correspond to one or more rules. In each of the plurality of iterations, the processing device 140 may determine whether at least one of the one or more rules is satisfied. In response to determining that at least one of the one or more rules is satisfied, the processing device 140 may terminate the iterative process. More details regarding the determination of the target ROI in the target image via the iterative process may be found elsewhere in the present disclosure, for example, in FIG. 7 and the description thereof.

It should be noted that the above description regarding the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be omitted and/or one or more additional operations may be added.

Figure 7:
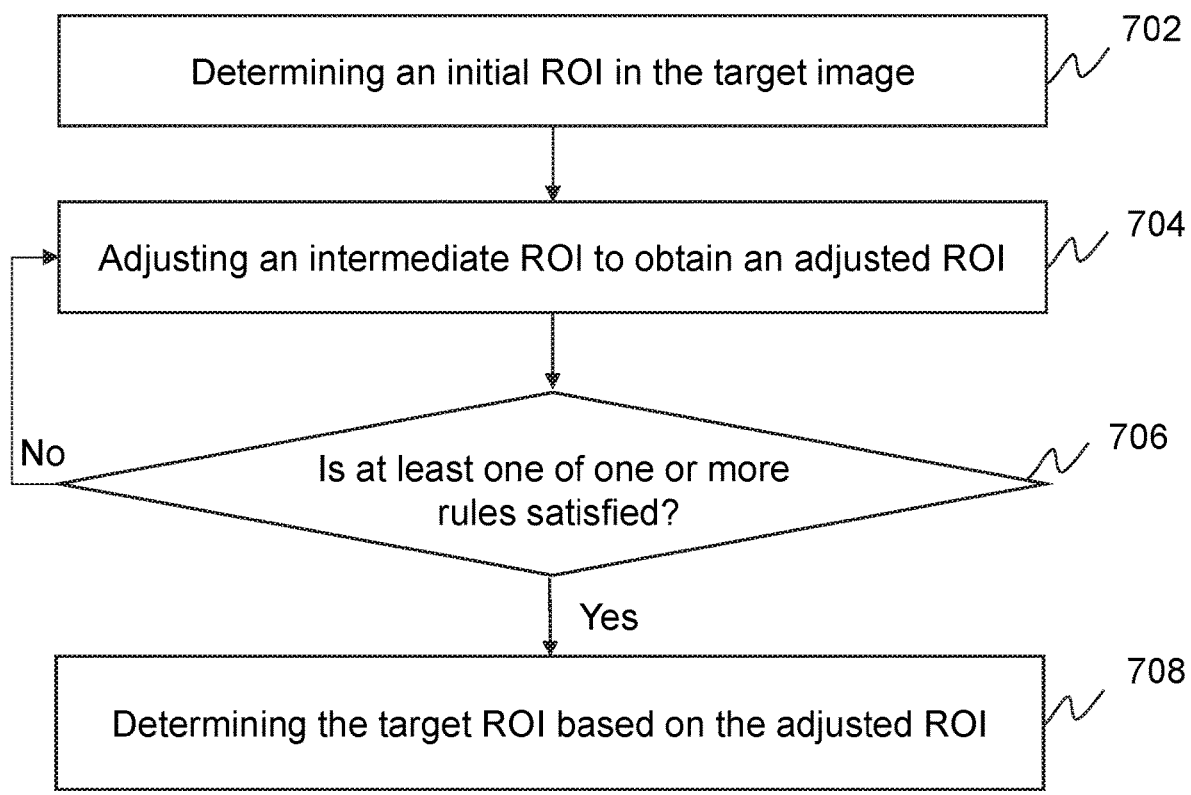
FIG. 7 is a flowchart illustrating an exemplary process for determining a target ROI through an iterative process according to some embodiments of the present disclosure.

FIG. 7 is a flowchart illustrating an exemplary process for determining the target ROI through a plurality of iterations according to some embodiments of the present disclosure. At least a portion of process 700 may be implemented by the processing device 140 (e.g., the processor 210 of the computing device 200 as illustrated in FIG. 2, the CPU 340 of the mobile device 300 as illustrated in FIG. 3, one or more modules as shown in FIG. 4). The operations of the illustrated process presented below are intended to be illustrative. In some embodiments, the process 700 may be accomplished with one or more additional operations not described, and/or without one or more of the operations discussed. Additionally, the order in which the operations of the process 2100 as illustrated in FIG. 7 and described below is not intended to be limiting.

In 702, the processing device 140 (e.g., the determination module 430) may determine an initial ROI in the target image. For instance, the target image may be a planning image for a radiation treatment. The processing device 140 may determine the initial ROI based on an isocenter (e.g., the planning isocenter) related to the radiation treatment. The size of the initial ROI may be a preset value stored in the storage device 150 or may be set and/or modified by a user (e.g., an operator). Merely by way of example, the isocenter may be located at a center (e.g., a geometric center, a center of mass, etc.) of the initial ROI. In some embodiments, the target image may be a 2D image and the initial ROI may have a 2D shape. For example, the initial ROI may be a circle, a triangle, a parallel, a square, a rectangle, a trapezoid, a pentagon, a hexagon, or the like. Alternatively, the initial ROI may have an irregular shape. In some embodiments, the target image may be a 3D image, and the initial ROI may have a 3D shape. For instance, the initial ROI may be a sphere, a cube, a cylinder, a pyramid, a circular cone, a circular truncated cone, or the like.

In 704, the processing device 140 (e.g., the determination module 430) may adjust (e.g., extend or reduce) an intermediate ROI to obtain an adjusted ROI. As used herein, the intermediate ROI refers to the initial ROI or an ROI obtained in a prior iteration. For instance, in the first iteration, the intermediate ROI may be the initial ROI. In the $i^{th}$ iteration, the intermediate ROI may be an ROI obtained in the $(i-1)^{th}$ iteration.

In some embodiments, the processing device 140 may adjust the intermediate ROI by extending at least a portion of the boundary of the intermediate ROI. The amount of extension of the boundary along at least two different directions may the same or different. Merely by way of example, the intermediate ROI may be a cube. The processing device 140 may extend the twelve sides of the cube along six orthogonal directions. For instance, the six orthogonal directions may be described using the 3D coordinate system 160 illustrated in FIG. 1. The six orthogonal directions may include a +X direction, a -X direction, a +Y direction, a -Y direction, a +Z direction, a -Z direction, or the like, or any combination thereof. In some embodiments, for each of at least some of the twelve sides of the cube, the side may be extended by a predetermined distance (e.g., 2 millimeters, 5 pixels/voxels, etc.) along one of the six orthogonal directions that is perpendicular to the side. The adjusted ROI may be a cube that has a greater volume than the intermediate ROI. As another example, for an intermediate ROI that is a cube, the processing device 140 may extend eight of the twelve sides of the cube along four orthogonal directions. For each of the eight sides of the cube, the side may be extended along one of the four orthogonal directions that is perpendicular to the side. The extension along two different directions may be the same or different. The adjusted ROI may have a greater volume than the intermediate ROI.

In 706, the processing device 140 (e.g., the determination module 430) may determine whether at least one of one or more rules is satisfied. The one or more rules may relate to the termination of the iterative process for determining the target ROI in the target image. In response to determining that none of the one or more rules is satisfied, the processing device 140 may proceed to operation 706 to continue to adjust the intermediate ROI. In response to determining that at least one of the one or more rules is satisfied, the processing device 140 may terminate the iterative process and proceed to operation 710.

For example, the one or more rules may include a first rule relating to the feature information of the one or more reference portions. The first rule may include that the adjusted ROI includes at least one pixel or voxel corresponding to at least one of the one or more reference portions. If the first rule is satisfied, the target ROI may include at least a part of a reference portion (e.g., a second reference portion related to the pose of the subject). The movement of the reference portion (e.g., a physiological movement or a movement caused by a pose difference) does not affect the position of the target portion of the subject. If the at least a part of the reference portion of the subject is included in the target ROI that is used for registering the target image with the reference image, the accuracy of the registration result may be decreased. Thus, the iterative process may need to be terminated when the processing device 140 determines that the first rule is satisfied. As another example, when the one or more reference portions include one or more first reference feature portions relating to the physiological movement, the first rule may include that the adjusted ROI includes a pixel or voxel corresponding to a movement region of at least one of the one or more first reference feature portions. As used herein, the term "movement region" of a first reference feature portion refers to a minimum region within which the movement of the first reference feature portion occurs. The movement region of the first reference feature portion may be determined in the target image based on the feature information related to the movement of the first reference feature portion. For example, the movement region may be determined based on the moving distance and the moving direction of the first reference feature portion, and a size of the first reference feature portion in the target image.

As another example, the one or more rules may include a second rule. The second rule may be associated with a predefined limit. The predefined limit may relate to factors such as a count of iterations that have been performed, an area/volume of the adjusted ROI, or the like. For instance, the second rule may include that the count of iterations that have been performed reaches a predetermined value. Additionally or alternatively, the second rule may include that the area/volume of the adjusted ROI reaches a predetermined area value/volume threshold.

As yet another example, the one or more rules may include a third rule. The third rule may include that the adjusted ROI includes at least one pixel or voxel that corresponds to an object located outside the body of the subject. For instance, the object may include air surrounding the subject, the couch of the first imaging device, etc.

In 708, the processing device 140 (e.g., the determination module 430) may determine the target ROI base on the intermediate ROI or the adjusted ROI. For instance, in response to determining that at least one of the first rule, the second rule, or the third rule is satisfied, the processing device 140 may determine the target ROI based on the adjusted ROI. The target ROI may be used in the registration of the target image with the reference image. More details regarding the registration may be found elsewhere in the present disclosure, for example, in the description related to operation 510.

In some embodiments, the processing device 140 may further generate a display image based on the target image and the target ROI. The processing device 140 may mark the target ROI on the target image to generate the display image. The user may view the display image via the terminal device 130. For example, the contour of the target ROI may be marked by a specific color that is different from other parts of the target image so that the user may easily identify the target ROI from the target image. As another example, the entire target ROI may be presented using the specific color. Additionally or alternatively, the terminal device 130 may provide a modification option for the user. The user may modify the target ROI in the display image, for example, by adjusting the contour of the target ROI using an input device such as a mouse or a touch screen.

It should be noted that the above description regarding the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method for determining a target region of interest (ROI) for image registration, implemented on a computing device having at least one processor and at least one non-transitory storage medium, the method comprising:
    obtaining a target image of a subject including a target portion of the subject;
    obtaining feature information related to movements of one or more feature portions of the subject, the feature information related to a movement of a feature portion of the one or more feature portions including at least one of a moving range related to the feature portion or whether the movement of the feature portion affects a position of the target portion of the subject;
    identifying, from the one or more feature portions, one or more reference portions of the subject based on the feature information of the one or more feature portions, wherein a position of the target portion of the subject is unrelated to a movement of the one or more reference portions; and
    determining, in the target image, the target ROI based on a portion of the feature information corresponding to the one or more reference portions, wherein the target ROI does not include a pixel or voxel associated with the one or more reference portions.

2. The method of claim 1, wherein the one or more feature portions of the subject include one or more first feature portions relating to a physiological movement.

3. The method of claim 2, wherein the identifying, from the one or more feature portions, one or more reference portions of the subject includes:
    for each of one or more portions at risk relating to the target portion, determining, based on the target image, a first distance between the target portion and the portion at risk of the subject; and
    for each of the one or more first feature portions of the subject,
        determining, based on the target image, a second distance between the target portion and the first feature portion; and
        determining, based on the corresponding feature information related to the first feature portion, the first distance and the second distance, whether the first feature portion is one of the one or more reference portions.

4. The method of claim 1, the image registration including registering the target image with a reference image, wherein
    the target image is generated based on a first scan of the subject holding a first pose at a first time point; and
    the reference image is generated based on a second scan of the subject holding a second pose at a second time point, the second time point being different from the first time point.

5. The method of claim 4, wherein the one or more feature portions of the subject include one or more second feature portions, a movement of the one or more second feature portions relating to a pose difference between the first pose and the second pose.

6. The method of claim 5, wherein the identifying, from the one or more feature portions, one or more reference portions of the subject includes:
    for each of the one or more second feature portions of the subject,
        determining, based on the target image, a third distance between the target portion and the second feature portion; and
        determining, based on the corresponding feature information related to the second feature portion and the third distance, whether the second feature portion is one of the one or more reference portions.

7. The method of claim 4, wherein the target image is a planning image for a radiotherapy treatment, and the reference image is a treatment image for the radiotherapy treatment.

8. The method of claim 1, wherein the determining, in the target image, the target ROI based on the portion of the feature information corresponding to the one or more reference portions includes:
    determining an initial ROI in the target image; and determining the target ROI by performing, based on the initial ROI, an iterative process including a plurality of iterations, wherein the iterative process corresponds to one or more rules, the one or more rules relate to a termination of the iterative process, and when at least one of the one or more rules is satisfied, the iterative process is terminated, the one or more rules including at least one rule relating to the portion of the feature information corresponding to the one or more reference portions.

9. The method of claim 8, wherein the determining the target ROI by performing, based on the initial ROI, an iterative process including a plurality of iterations includes:
in each of the plurality of iterations,
adjusting an intermediate ROI to obtain an adjusted ROI, wherein the intermediate ROI is the initial ROI or an adjusted ROI obtained in a prior iteration;
determining whether at least one of the one or more rules is satisfied; and
in response to determining that at least one of the one or more rules is satisfied,
terminating the iterative process; and
designating the adjusted ROI as the target ROI.

10. The method of claim 9, wherein:
the one or more reference portions include one or more first reference portions relating to a physiological movement; and
the at least one rule relating to the portion of the feature information corresponding to the one or more reference portions includes that the adjusted ROI includes a pixel or voxel corresponding to a movement region of at least one of the one or more first reference feature portions, wherein the movement region is determined, in the target image, based on the feature information related to a movement of the one or more first reference feature portions.

11. The method of claim 9, wherein:
the one or more reference portions include one or more second reference portions, a position of each of the one or more second reference feature portions being related to a pose of the subject; and
the at least one rule relating to the portion of the feature information corresponding to the one or more reference portions includes that the adjusted ROI includes at least one pixel or voxel corresponding to at least one of the one or more second reference feature portions.

12. The method of claim 8, wherein the determining an initial ROI in the target image includes:
identifying, in the target image, an isocenter related to a radiotherapy treatment, the isocenter referring to a point in space where radiation beams emitted from different angles are expected to intersect when a gantry of a radiotherapy device is rotating; and
determining, in the target image, the initial ROI based on the isocenter by locating the isocenter at a center of the initial ROI.

13. The method of claim 1, further comprising:
determining, in the target ROI, a target sub-ROI for the image registration.

14. A system, comprising:
at least one non-transitory storage medium including a set of instructions for determining a target region of interest (ROI) for image registration; and
at least one processor in communication with the at least one non-transitory storage medium, wherein when executing the set of instructions, the at least one processor is configured to cause the system to perform operations including:
obtaining a target image of a subject including a target portion of the subject;
obtaining feature information related to movements of one or more feature portions of the subject, the feature information related to a movement of a feature portion of the one or more feature portions including at least one of a moving range related to the feature portion or whether the movement of the feature portion affects a position of the target portion of the subject;
identifying, from the one or more feature portions, one or more reference portions of the subject based on the feature information of the one or more feature portions, wherein a position of the target portion of the subject is unrelated to a movement of the one or more reference portions; and
determining, in the target image, the target ROI based on a portion of the feature information corresponding to the one or more reference portions, wherein the target ROI does not include a pixel or voxel associated with the one or more reference portions.

15. The system of claim 14, wherein the one or more feature portions of the subject includes one or more first feature portions relating to a physiological movement.

16. The system of claim 14, the image registration including registering the target image with a reference image, wherein
the target image is generated based on a first scan of the subject holding a first pose at a first time point; and
the reference image is generated based on a second scan of the subject holding a second pose at a second time point, the second time point being different from the first time point.

17. The system of claim 16, wherein the one or more feature portions of the subject includes one or more second feature portions, a movement of the one or more second feature portions relating to a pose difference between the first pose and the second pose.

18. The system of claim 14, wherein the determining, in the target image, the target ROI based on the portion of the feature information corresponding to the one or more reference portions includes:
determining an initial ROI in the target image; and
determining the target ROI by performing, based on the initial ROI, an iterative process including a plurality of iterations, wherein the iterative process corresponds to one or more rules, the one or more rules relate to a termination of the iterative process, and when at least one of the one or more rules is satisfied, the iterative process is terminated, the one or more rules including at least one rule relating to the portion of the feature information corresponding to the one or more reference portions.

19. The method of claim 18, wherein the determining an initial ROI in the target image includes:
identifying, in the target image, an isocenter related to a radiotherapy treatment, the isocenter referring to a point in space where radiation beams emitted from different angles are expected to intersect when a gantry of a radiotherapy device is rotating; and
determining, in the target image, the initial ROI based on the isocenter by locating the isocenter is located at a center of the initial ROI.

20. A non-transitory computer readable medium, comprising at least one set of instructions, wherein when executed by at least one processor of a computing device, the at least one set of instructions direct the at least one processor to perform operations including:
- obtaining a target image of a subject including a target portion of the subject;
- obtaining feature information related to movements of one or more feature portions of the subject, the feature information related to a movement of a feature portion of the one or more feature portions including at least one of a moving range related to the feature portion or whether the movement of the feature portion affects a position of the target portion of the subject;
- identifying, from the one or more feature portions, one or more reference portions of the subject based on the feature information of the one or more feature portions, wherein a position of the target portion of the subject is unrelated to a movement of the one or more reference portions; and
- determining, in the target image, the target ROI based on a portion of the feature information corresponding to the one or more reference portions, wherein the target ROI does not include a pixel or voxel associated with the one or more reference portions.

* * * * *